(12) United States Patent
Lohman et al.

(10) Patent No.: US 6,763,359 B2
(45) Date of Patent: Jul. 13, 2004

(54) LEARNING FROM EMPIRICAL RESULTS IN QUERY OPTIMIZATION

(75) Inventors: Guy Maring Lohman, San Jose, CA (US); Michael Stillger, San Jose, CA (US); Volker Markl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 09/876,642

(22) Filed: Jun. 6, 2001

(65) Prior Publication Data

US 2002/0198867 A1 Dec. 26, 2002

(51) Int. Cl.⁷ .............................................. G06F 17/30
(52) U.S. Cl. ........................................ 707/102; 707/2
(58) Field of Search ..................................... 707/102, 2

(56) References Cited

U.S. PATENT DOCUMENTS

| | | | | |
|---|---|---|---|---|
| 5,412,806 A | * | 5/1995 | Du et al. ........................ | 707/2 |
| 5,546,576 A | * | 8/1996 | Cochrane et al. .............. | 707/2 |
| 5,619,692 A | * | 4/1997 | Malkemus et al. ............. | 707/2 |
| 5,806,061 A | * | 9/1998 | Chaudhuri et al. ............. | 707/3 |
| 5,918,232 A | * | 6/1999 | Pouschine et al. ....... | 707/103 R |
| 5,978,789 A | * | 11/1999 | Griffin et al. .................... | 707/2 |
| 5,995,959 A | * | 11/1999 | Friedman et al. ............... | 707/3 |
| 6,092,062 A | * | 7/2000 | Lohman et al. ................. | 707/2 |
| 6,205,441 B1 | * | 3/2001 | Al-omari et al. ............... | 707/2 |
| 6,330,552 B1 | * | 12/2001 | Farrar et al. .................. | 705/400 |
| 6,339,768 B1 | * | 1/2002 | Leung et al. .................... | 707/2 |
| 6,421,663 B1 | * | 7/2002 | Chen et al. ...................... | 707/3 |
| 6,449,618 B1 | * | 9/2002 | Blott et al. .................. | 707/101 |
| 6,510,422 B1 | * | 1/2003 | Galindo-Legaria et al. .... | 707/2 |
| 6,549,907 B1 | * | 4/2003 | Fayyad et al. .............. | 707/101 |
| 2002/0143754 A1 | * | 10/2002 | Paulley et al. .................. | 707/3 |

OTHER PUBLICATIONS

A. Aboulnaga and S. Chaudhuri, Self–tuning Histograms: Building Histograms Without Looking at Data, SIGMOD Conference 1999.

R. Ahad, K.V.B. Rao, and D. McLeod, On Estimating the Cardinality of the Projection of a Database Relation, ACM Transactions on Databases, vol. 14, No. 1 (Mar. 1989), pp. 28–40.

N. Bruno, S. Chaudhuri, and L. Gravano, STHoles: A Multidimensional Workload Aware Histogram, SIGMOD Conference 2001.

C. M. Chen and N. Roussopoulos, Adaptive Selectivity Estimation Using Query Feedback, SIGMOD Conference 1994.

(List continued on next page.)

*Primary Examiner*—Wayne Amsbury
(74) *Attorney, Agent, or Firm*—Gates & Cooper LLP

(57) ABSTRACT

An optimizer function of a Relational Database Management System (RDBMS) generates alternative query execution plans (QEPs) for executing a query, provides an execution model of each of the QEPs, chooses one of the QEPs for execution based on the model associated therewith, and exploits an empirical measurement from the execution of the chosen QEP to validate the model associated therewith, by determining whether the model is in error, and by computing one or more adjustments to the model to correct the determined error.

28 Claims, 7 Drawing Sheets

OTHER PUBLICATIONS

A. Van Gelder, Multiple Join Size Estimation by Virtual Domains (extended abstract), Procs. of ACM PODS Conference, Washington, D.C., May 1993, pp. 180–189.

P. B. Gibbons, Y. Matias and V. Poosala, Fast Incremental Maintenance of Approximate Histograms, Proceedings of the 23rd Int. Conf. On Very Large Databases, Athens, Greece, 1999.

P. Haas and A. Swami, Sampling–Based Selectivity Estimation for Joins—Using Augmented Frequent Value Statistics, IBM Research Report RJ9904, 1993.

Y.E. Ioannidis and S. Christodoulakis. On the Propagation of Errors in the Size of Join Results, SIGMOD Conference, 1991.

N. Kabra and D. DeWitt, Efficient Mid–Query Re–Optimization of Sub–Optimal Query Execution Plans, SIGMOD Conference 1998.

C. Lynch, Selectivity Estimation and Query Optimization in Large Databases with Highly Skewed Distributions of Column Values, Proceedings of the 14th Int. Conf. On Very Large Databases, 1988.

V. Poosala and Y. Ioannidis, Selectivity Estimation without the attribute value independence assumption, Proceedings of the 23rd Int. Conf. On Very Large Databases, 1997.

V. Poosala, Y. Ioannidis, P. Haas, and E. Shekita, Improved histograms for selectivity estimation of range predicates, SIGMOD Conf. 1996, pp. 294–305.

P.G. Selinger, M. M. Astrahan, D. D. Chamberlin, R. A. Lorie, T. G. Price, Access Path Selection in a Relational Database Management System, SIGMOD Conference 1979, pp. 23–34.

A.N. Swami, K. B. Schiefer, On the Estimation of Join Result Sizes, EDBT 1994, pp. 287–300.

T. Urhan, M.J. Franklin and L. Amsaleg, Cost–based Query Scrambling for Initial Delays, SIGMOD Conference 1998.

Y.E. Ioannidis et al., Parametric query optimization, The VLDB Journal, 1997, 6:132–151.

* cited by examiner

LEARNING FROM EMPIRICAL RESULTS IN QUERY OPTIMIZATION

BACKGROUND OF THE INVENTION

1. Field of the Invention

This invention relates in general to database management systems performed by computers, and in particular, to learning from empirical results in query optimization.

2. Description of Related Art (Note: This application references a number of different publications as indicated throughout the specification by mnemonics enclosed in brackets, e.g., [Authorxx], wherein Author is the author's name (or abbreviation thereof) and xx is the year of publication. A list of these different publications with their associated mnemonics can be found in Section 6 entitled "Bibliography" in the "Detailed Description of the Preferred Embodiment." Each of these publications is incorporated by reference herein.)

Computer systems incorporating Relational DataBase Management System (RDBMS) software using a Structured Query Language (SQL) interface are well known in the art. The SQL interface has evolved into a standard language for RDBMS software and has been adopted as such by both the American National Standards Institute (ANSI) and the International Standards Organization (ISO).

In an RDBMS system, queries typically specify what data is to be accessed, rather than how that data is to be accessed. An SQL Query Compiler, and specifically an optimizer function of the SQL Query Compiler, automatically determines the appropriate way to access and process the data referenced in a single SQL query. This is done by considering many possible query execution plans (QEPs), evaluating the estimated cost of each plan, and choosing the cheapest plan in terms of estimated execution cost.

The estimated execution cost is largely dependent upon the number of rows that will be processed by each operator in the QEP. Estimating the number of rows or cardinality after one or more predicates have been applied has been the subject of much research for over 20 years [SAC+79, Gel93, SS94, ARM89, Lyn88]. Typically, this estimate relies on statistics of database characteristics, beginning with the number of tows for each table, multiplied by a filter factor or selectivity for each predicate, derived from the number of distinct values and other statistics on columns. The selectivity of a predicate P effectively represents the probability that any row in the database will satisfy P.

While query optimizers do a remarkably good job of estimating both the cost and the cardinality of most queries, many assumptions underlie this mathematical model. Examples of these assumptions include:

Currency of information: The statistics are assumed to reflect the current state of the database, i.e. that the database characteristics are relatively stable.

Uniformity: Although histograms deal with skew in values for "local" selection predicates (to a single table), there are no products available that exploit them for joins.

Independence of predicates: Selectivities for each predicate are calculated individually and multiplied together, even though the underlying columns may be related, e.g., by a functional dependency. While multi-dimensional histograms address this problem for local predicates, again they have never been applied to join predicates, aggregation, etc. Applications common today have hundreds of columns in each table and thousands of tables, making it impossible to know on which subset(s) of columns to maintain multi-dimensional histograms.

Principle of inclusion: The selectivity for a join predicate X.a=Y.b is typically defined to be $1/MAX(|a|, |b|)$, where $|a|$ denotes the number of distinct values of column a and $|b|$ denotes the number of distinct values of column b. This implicitly assumes the "principle of inclusion", i.e., that each value of the smaller domain has a match in the larger domain (which is frequently true for joins between foreign keys and primary keys).

When these assumptions are invalid, significant errors in the cardinality, and hence cost, estimates result, causing sub-optimal plans to be chosen. The primary cause of major modeling errors is the cardinality estimate on which costs depend. Cost estimates might be off by 10 or 15 percent, at most, for a given cardinality, but cardinality estimates can be off by orders of magnitude when their underlying assumptions are invalid or uncertain. Although there has been considerable success in using histograms to detect and correct for data skew [IC91, PIHS96, PI97], and in using sampling to gather up-to-date statistics [HS93, UFA98], there has to date been no comprehensive approach to correcting all modeling errors, regardless of origin.

Much of the prior literature on cardinality estimates has utilized histograms to summarize the data distribution of columns in stored tables, for use in estimating the selectivity of predicates against those tables. Recent work has extended one-dimensional equi-depth histograms to mote sophisticated and accurate versions [PIHS96] and to multiple dimensions [PI97]. This classical work on histograms concentrated on the accuracy of histograms in the presence of skewed data and correlations by scanning the base tables completely, at the price of high run-time cost. The work in [GMP97] deals with the necessity of keeping histograms up-to-date at very low cost. Instead of computing a histogram on the base table, it is incrementally derived and updated from a backing sample of the table, which is always kept up-to-date. Updates of the base table are propagated to the sample and can trigger a partial re-computation of the histogram, but there is no attempt to validate the estimates from these histograms against run-time actual statistics.

The work of [CR94] and [AC99] are the first to monitor cardinalities in query executions and exploit this information in future compilations. In [CR94], the result cardinalities of simple predicates after the execution of a query are used to adapt the coefficients of a curve-fitting formula. The formula approximates the value distribution of a column instead of employing histograms for selectivity estimates. In [AC99], the authors present a query feedback loop, in which actual cardinalities gleaned from executing a query are used to correct histograms. Multiple predicates can be used to detect correlation and update multi-dimensional histograms [BCG01]. This approach effectively deals with single-table predicates applied while accessing a base table, but the paper does not deal with join predicates, aggregation, and other operators, nor does it specify how the user is supposed to know on which columns multi-dimensional histograms should be created.

Another research direction focuses on dynamically adjusting a QEP after the execution has begun, by monitoring data statistics during the execution (dynamic optimization). In [KDeW98], the authors introduce a new statistic collector operator that is compiled into the plan. The operator collects the row stream cardinality and size and decides whether to continue or to stop the execution and re-optimize the remainder of the plan. Query scrambling in [UFA98] is geared towards the problem of distributed query execution in wide area networks with uncertain data delivery. Here, the time-out of a data-shipping site is detected and the remaining data-independent parts of the plan are re-scheduled until the problem is solved. Both solutions deal with dynamic re-optimization of (parts of) a single query, but they do not save and exploit this knowledge for the next query optimization run.

In light of the above, there is a need in the art for an effective and comprehensive technique for query optimizers to learn from any modeling mistake at any point in a QEP. There is also a need for such learning optimizers to automatically validate cost estimates against actual costs incurred in the execution of queries. The use of validation would allow models of QEPs to be adjusted for better optimization of future queries. Moreover, validation would also allow database statistics to be adjusted to better reflect the characteristics of the database.

SUMMARY OF THE INVENTION

To overcome the limitations in the prior art described above, and to overcome other limitations that will become apparent upon reading and understanding the present specification, the present invention discloses a method, apparatus, and article of manufacture for optimizing queries in a Relational Database Management System (RDBMS) by generating a plurality of query execution plans (QEPs) for the query, providing an execution model of each of the QEPs, choosing one of the QEPs for execution based on the model associated therewith, and exploiting an empirical measurement from the execution of the chosen QEP to validate the model associated therewith, by determining whether the model is in error, and by computing one or mote adjustments to the model to correct the determined error.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

1 Overview

The present invention introduces a Learning Optimizer (LEO) system that provides a comprehensive way to repair an incorrect model of a query execution plan (QEP). By monitoring previously executed queries, LEO compares the optimizer's model with the actual execution at each step in a QEP, and computes adjustments to the model that may be used during future query optimizations. In the preferred embodiment, the model comprises a cost estimate based on statistics maintained by a database management system, although other models may be used as well.

This analysis can be done either on-line or off-line, on the same or a different system, and either incrementally or in batches. In this way, LEO introduces a feedback loop to query optimization that enhances the available information on the database where the most queries have occurred, allowing the optimizer to actually learn from its past mistakes.

The technique is general and can be applied to any operation in a QEP (not just selection predicates on base tables), including joins, derived results after several predicates have been applied, and even to DISTINCT and GROUP-BY operators. As shown by performance measurements on an experimental system, the runtime overhead of LEO's monitoring is insignificant, whereas the potential benefit to response time from more accurate cardinality and cost estimates can be orders of magnitude.

2 The Learning Optimizer

This section provides an overview of LEO's design, a simplified example of how it learns, and some of the practical issues with which it must deal.

2.1 An Overview of LEO

Figure 1:
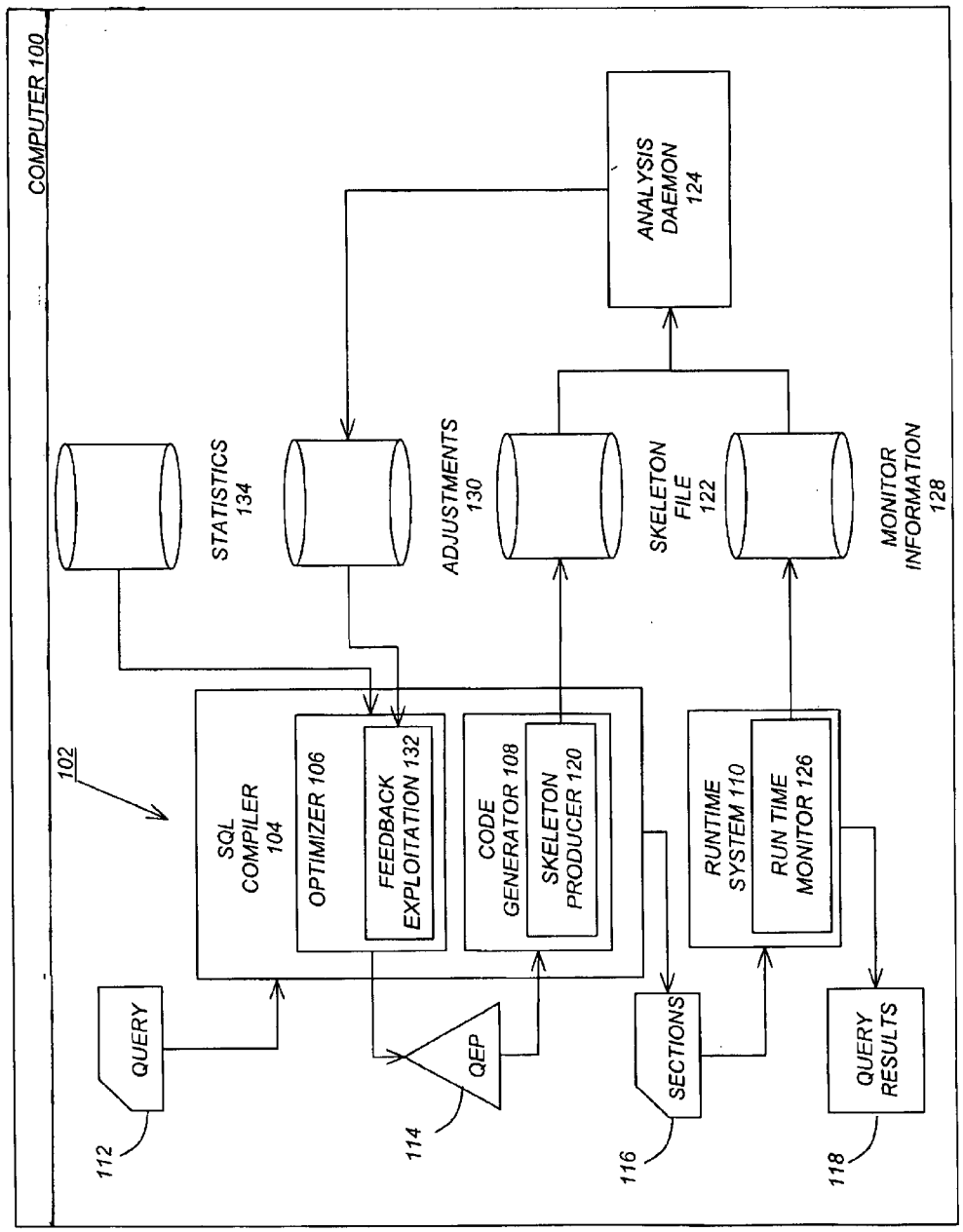
FIG. 1 illustrates an exemplary hardware and software environment that could be used with the preferred embodiment of the present invention.

FIG. 1 illustrates a data flow and logic flow in an exemplary hardware and software environment that could be used with the preferred embodiment of the present invention. In the exemplary environment, a computer 100 executes a relational database management system (RDBMS) 102. In the preferred embodiment of the present invention, the RDBMS 102 comprises the DataBase 2 (DB2™) Universal DataBase (UDB™) product offered by IBM Corporation, although those skilled in the art will recognize that the present invention has application to any RDBMS.

In FIG. 1, the RDBMS 102 includes an SQL Compiler 104 that is comprised of an Optimizer 106 and a Code Generator 108, and a Runtime System 110. Standard query 112 processing is shown on the left-side of FIG. 1. A query 112 is input into the SQL Compiler 104, and the Optimizer 106 generates one or mote QEPs 114 from the translated query 112. The QEPs 114 are then used by the Code Generator 108 to generate one or more Sections 116. The Sections 116 are executed by the Runtime System 110 to create the Query Results 118.

A number of changes are made to regular query processing to enable LEO's feedback loop. For any query 112, the Code Generator 108 includes a Skeleton Producer 120 that stores essential information about the chosen QEP 114 (i.e., a plan "skeleton") into a skeleton file 122 that is later used by an Analysis Daemon 124. In the same way, the Runtime System 110 includes a Runtime Monitor 126 that provides monitor information 128 about cardinalities for each operator in the Sections 116. Analyzing the plan skeletons 122 and the monitor information 128, the Analysis Daemon 124 computes adjustments 130 that are stored in a system catalog. A Feedback Exploitation component 132 of the Optimizer 106 closes the feedback loop by using the adjustments 130 to modify statistics 134 (e.g., the cardinality estimates) used by the Optimizer 106.

These components work together to exploit empirical measurements from actual executions of queries 112 to validate a model used by the Optimizer 106, deduce what part of the model is in error, and then compute adjustments 130 to the model. Moreover, these components can operate independently, but form a consecutive sequence that constitutes a continuous learning mechanism by incrementally capturing QEPs 114, monitoring the execution of Sections 116, analyzing the monitor information 128, and then computing adjustments 130 to be used to modify the statistics 134 for future query 112 compilations.

Note that the Skeleton Producer 120, Runtime Monitor 126, and Feedback Exploitation 132 are usually components of the RDBMS 102, while the Analysis Daemon 124 may be a component of the RDBMS 102 or may be a standalone process that runs separately from the RDBMS 102. In addition, the Analysis Daemon 124 may use further metadata such as key constraints or referential constraints for providing adjustments 130. Further, the Analysis Daemon 124 might not compute adjustments 130, but could update the statistics 134 directly.

Generally, the RDBMS 102, its components, and the LEO components, comprise logic and/or data that is embodied in or retrievable from a device, medium, carrier, or signal, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby. Those skilled in the art will also recognize that the components of the present invention could be tightly integrated or loosely coupled.

2.2 Monitoring and Learning: An Example

In describing the preferred embodiment, the following SQL query is used as an example:

SELECT * FROM X, Y, Z
WHERE X.PRICE>=100 AND
   Z.CITY='DENVER' AND
   Y.MONTH='DEC' AND
   X.ID=Y.ID AND
   Y.NR=Z.NR
GROUP BY A

Figure 2:
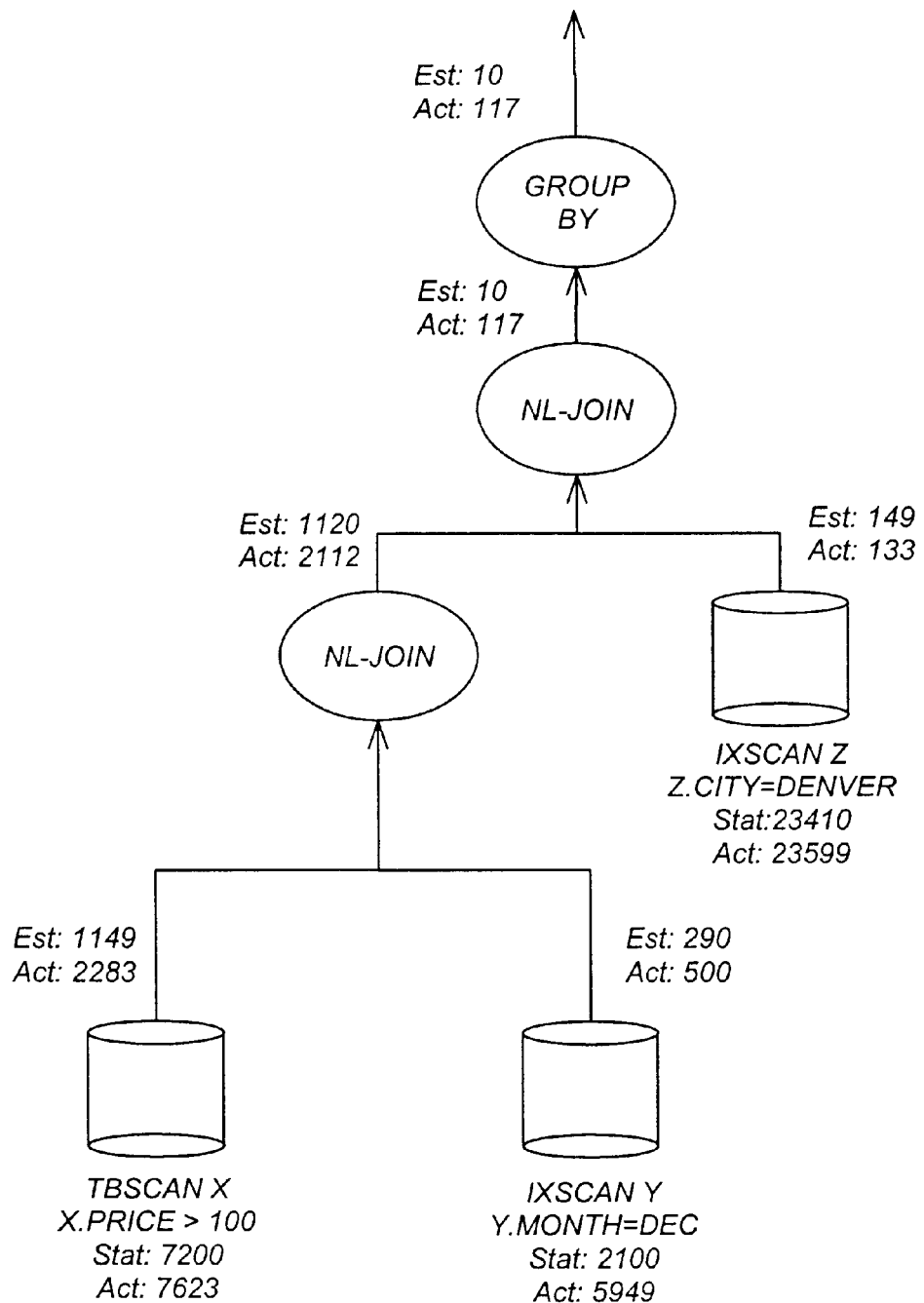
FIG. 2 shows a skeleton of a query execution plan, including statistical information and estimates that an optimizer uses when building the plan.

FIG. 2 shows the skeleton 122 of a QEP 114 for this query 112, including the statistical information and estimates that the Optimizer 106 used when building this QEP 114. In addition, FIG. 2 also shows the actual cardinalities that the Runtime Monitor 126 determined during execution.

In FIG. 2, cylinders indicate base table access operators such as index scan (IXSCAN) or table scan (TBSCAN), ellipses indicate further operators as nested loop joins (NL-JOIN) and grouping (GROUP BY). For the base tables X, Y, and Z, "Stat" denotes the base table cardinality as stored in the statistics 134. The Optimizer 106 uses this cardinality in its cardinality estimation model to compute an estimate ("Est") for the result cardinality of each table access operator after application of the predicate (e.g., X.Price>=100) as well as for each of the nested-loop join operators. During execution, the Runtime Monitor 126 measures the comparable actual cardinality ("Act") for each operator.

Comparing actual and estimated cardinalities enables LEO to give feedback to the statistics 134 that were used for obtaining the base table cardinalities, as well as to the cardinality model that was used for computing the estimates. This feedback may be a positive reinforcement, e.g., for the table statistics of Z, where the table access operator returned an actual cardinality for Z that is very close to that stored in the system catalog statistics 134. The same holds for the output cardinalities of each operator, such as a positive feedback for the estimate of the restriction on Z that also very closely matches the actual number. However, it may also be a negative feedback, as for the table access operator of Y, where the statistics 134 suggest a number almost three times lower than the actual cardinality, or for the join estimates of the nested-loop join between X and Y. In addition, correlations can be detected, if the estimates for the individual predicates are known to be accurate but some combination of them is not. In all of the above, "predicates" can actually be generalized to any operation that changes the cardinality of the result. For example, the creation of keys by a DISTINCT or GROUP-BY clause reduces the number of rows. The estimates of the RDBMS 102 for this reduction can also be adjusted by LEO, and may also be correlated with predicates applied elsewhere in the query.

All of this feedback is used by LEO to help the Optimizer 106 learn to better estimate cardinalities the next time a query involving these tables, predicates, joins, or other operators is issued against the database.

2.3 Practical Considerations

In the process of implementing LEO, several practical considerations became evident that prior work had not addressed. The following discusses some of these general considerations, and how they affected LEO's design.

2.3.1 The Hippocratic Oath: "Do no harm!"

The overall goal of LEO is to improve query performance by adjusting existing statistics 134 based upon previously executed queries 112. Ideally, the adjustments 130 made to the statistics 134 provide a better decision basis for selecting the best QEP 114 for a query 112. However, this learned knowledge must be arrived at extremely conservatively: LEO should not make hasty conclusions based upon inconclusive or spotty data. And it must be used carefully: under no circumstances should LEO make things worse! In critical applications, stability and reliability of query 112 processing are often favored over optimality with occasional unpredictable behavior. If adjustments are immediately taken into account for query optimization, even on a highly dynamic database, the same query 112 may generate a different QEP 114 each time it is issued and thus may result in a thrashing of QEPs 114. This instability can be avoided if re-optimization of queries 112 takes place after the learned knowledge has converged to a fixed point or by reaching a defined threshold of reliability. Thus, a typical usage pattern of LEO might be an initial phase of learning, followed by a stable phase where the QEPs 114 are frozen in order to obtain fast, reliable query processing.

2.3.2 Modifying Statistics vs. Adjusting Selectivities

A key design decision is that LEO never updates the original catalog statistics 134. Instead, it constructs adjustments 134 that will be used to repair the original catalog statistics 134, wherein the adjustments 130 are stored as special tables in the system catalog. The compilation of new queries 112 reads these adjustments 130, as well as the original statistics 134, and adjusts the model used by the Optimizer 106 appropriately. This two-layered approach has several advantages. First, it provides the option of disabling learning, by simply ignoring the adjustments 130. This may be needed for debugging purposes or as a fallback strategy in case the system generated wrong adjustments 130 or the new optimal QEP 114 shows undesired side effects. Second, the specific adjustments 130 can be stored with any plan skeleton 122 that uses it, so that it is known by how much selectivities have already been adjusted and incorrect re-adjustments can be worded (no "deltas of deltas"). Lastly, since the adjustments 130 are kept as catalog tables, an easily accessible mechanism is introduced for tuning the selectivities of query 112 predicates that could be updated manually by experienced users, if necessary.

2.3.3 Consistency between Statistics

The RDBMS 102 collects statistics 134 for base tables, columns, indexes, functions, and tablespaces, many of which are mutually interdependent, and stores them in the system catalog. The RDBMS 102 allows for incremental generation of statistics 134 and checks inconsistencies for user-updateable statistics 134. LEO also must ensure the consistency of these interdependent statistics 134. For example, the number of rows of a table determines the number of disk pages used for storing these rows. When adjusting the number of rows of a table, LEO consequently also has to ensure consistency with the number of pages of that table, e.g., by adjusting this figure as well or else plan choices will be biased. Similarly, the consistency between index and table statistics 134 has to be preserved: if the cardinality of a column that is (a prefix of) an index key is adjusted in the table statistics 134, this may also affect the corresponding index statistics 134.

2.3.4 Currency vs. Accuracy

Creating statistics 134 is a costly process, since it requires scanning an entire table or even the entire database. For this reason, database statistics 134 are often not existent or not accurate enough to help the Optimizer 106 to pick the best QEP 114. If statistics 134 are expected to be outdated due to later changes of the database or if no statistics 134 are present, the RDBMS 102 synthesizes statistics 134 from the base parameters of the table (e.g., the file size is determined from the operating system and individual column sizes). The presence of adjustments 130 and synthesized statistics 134 creates a decision problem for the Optimizer 106, i.e., it must decide whether to believe possibly outdated adjustments 130 and statistics 134, or fuzzy but current synthesized statistics 134.

When statistics 134 are updated, many of the adjustments 130 calculated by LEO no longer remain valid. Since the set of adjustments 130 that LEO maintains is not just a subset of the statistics 134 provided by a RUNSTATS utility of the RDBMS 102, removing all adjustments 130 during an update of the statistics 134 might result in a loss of information. Therefore, any update of the statistics 134 should re-adjust the adjustments 130 appropriately, in order to not lose information like actual join selectivities and retain consistency with the new statistics 134.

2.3.5 LEO vs. Database Statistics

Note that LEO is not a replacement for statistics 134, but rather a complement: LEO gives the most improvement to the modeling of queries 112 that are either repetitive or are similar to earlier queries 112, i.e., queries 112 for which the model used by the Optimizer 106 exploits the same statistics 134. LEO extends the capabilities of the RUNSTATS utility by gathering information on derived tables (e.g., the result of several joins) and gathering more detailed information than RUNSTATS might. Over time, the estimates of the Optimizer 106 will improve most in regions of the database that are queried most (as compared to statistics 134, which are collected uniformly across the database, to be ready for any possible query). However, for correctly costing previously unanticipated queries 112, the statistics 134 collected by RUNSTATS are necessary even in the presence of LEO.

3 The LEO Feedback Loop

The following sections describe the details of how LEO performs the four steps of capturing the QEP 114 for a query 112 and its cardinality estimates, monitoring the QEPs 114 during execution, analyzing the cost estimates versus the actual statistics 134, and the exploitation of the adjustments 130 in the optimization of subsequent queries 112.

3.1 Retaining the Plan and its Estimates

During query 112 compilation in the RDBMS 102, the Code Generator 108 derives an executable program from the optimal QEP 114. This program, called a Section 116, can be executed immediately (dynamic SQL) or stored in the database for later, repetitive execution of the same query 112 (static SQL). The optimal QEP 114 is not retained with the Section 116; only the Section 116 is available at run-time. The Section 116 contains one or more threads, which are sequences of operators that are interpreted at run-time. Some of the operators of the Section 116, such as a table access, closely resemble similar operators in the QEP 114. Others, such as those performing predicate evaluation, are much more detailed. Although in principle it is possible to "reverse engineer" a Section 116 to obtain the QEP 114 from which it was derived; in practice, that is quite complicated. To facilitate the interpretation of the Runtime Monitor 126 output, a plan skeleton 122 comprising a subset of the optimal QEP 114 for each query 112 is saved at compile-time, as an analysis "road map". This plan skeleton 122 is a subset of the much more complete QEP 114 information that may optionally be obtained by a user through an EXPLAIN of the query 112, and contains only the basic information needed by LEO's analysis, including the cumulative cardinality estimates for each QEP 114 operator, as shown in FIG. 2.

3.2 Monitoring Query Execution

LEO captures the actual number of rows processed by each operator in the Section 116 by carefully instrumenting the Section 116 with run-time counters. These counters are incremented each time an operator processes a row, and saved after execution completes. LEO can be most effective if this monitoring is on all the time, analyzing the execution of every Section 116 in the workload. For this to be practical, the Runtime Monitor 126 must impose minimal overhead on regular Section 116 execution performance. The overhead for incrementing these counters has been measured and shown to be minimal, as discussed in Section 4.1 below.

3.3 Analyzing Actual Statistics and Estimates

The Analysis Daemon 124 may be run on-line or off-line as a batch process, on the same or a completely separate system, either incrementally or in batch mode. The latter provides more responsive feedback to the Optimizer 106, but is harder to engineer correctly. To have minimal impact on Section 116 execution performance, the Analysis Daemon 124 is designed to be run as a low-priority background process that opportunistically seizes "spare cycles" to perform its work "post-mortem". Any mechanism can be used to trigger or continue its execution, which is preferably an automated scheduler that supervises the workload of the system 100. Since this means LEO can be interrupted by the scheduler at any point in time, it is designed to analyze and to produce feedback data on a per-query basis. It is not necessary to accumulate the monitor information 128 of a large set of Sections 116 to produce feedback results.

To compare the actual statistics collected in the monitor information 128 with the statistics 134 used by the Optimizer 106 for that query 112, the Analysis Daemon 124 of LEO must first find the corresponding plan skeleton 122 for that query 112. Each plan skeleton 122 is hashed into memory. Then, for each entry in the monitor information 128 file (representing a Section 116 execution), it finds the matching skeleton 122 by probing into the hash table of the skeleton 122. Once a match is located, LEO maps the Runtime Monitor 126 counters for each Section 116 operator back to the appropriate Section 116 operator in the skeleton 122. This is not as straightforward as it sounds, because there is not a one-to-one relationship between the operators of the skeleton 122 and the operators of the Section 116. In addition, certain performance-oriented optimizations will bypass operators in the Section 116 if possible, thus also bypassing incrementing their counters. LEO must detect and compensate for this.

The following pseudo-code describes the LEO algorithm:

```
analyze_main(skeleton root) {                                         (0)
    preprocess (root); error = OK;  // construct global state and
                                    // pushdown node properties       (1)
    for (i = 0; i < children(root); i++) // for each child             (2)
        {error |= analyze_main(root->child[i]); } // analyze           (3)
    if (error) return error; // if error in any child: return error    (4)
    switch (root->opcode) // analyze operator                          (5)
        case IXSCAN: return analyze_ixscan(root)                       (6)
        case TBSCAN: return analyze_tbscan(root)                       (7)
        case . . .
```

The analysis of the tree comprising the skeleton 122 is a recursive post-order traversal. Before actually descending down the tree, a preprocessing of the node and its immediate children is necessary to construct global state information and to push down node properties (1). The skeleton 122 is analyzed from the bottom up, where the analysis of a branch stops after an error occurred in the child (4). Upon returning from all children, the analysis function of the particular operator is called (6, 7, . . .).

3.3.1 Calculating the Adjustments

Each operator type (TBSCAN, IXSCAN, FETCH, FILTER, GROUP BY, NLJOIN, HSJOIN, etc.) can carry multiple predicates of different kinds (start/stop keys, pushed down, join). According to the processing order of the predicates within the operator, LEO will find the actual monitor information 128 (input and output cardinalities of the data stream for the predicate) and analyze the predicate. By comparing the actual selectivity of the predicate with the estimated selectivity that was stored with the skeleton 122, LEO deduces an adjustment 130 such that the Optimizer 106 can later compute the correct selectivity factor from the old statistics 134 and the new adjustments 130. This adjustment 130 is immediately stored in the system tables. Note that LEO does not need to re-scan the catalog tables to get the original statistics 134, because the estimates that ate based on these statistics 134 are stored with the skeleton 122.

LEO computes an adjustment 130 such that the product of the adjustment 130 and the estimated selectivity derived from the statistics 134 of the RDBMS 102 yields the correct selectivity. To achieve that, LEO uses the following variables that were saved in the skeleton 122 or monitor information 128:

old_est: the estimated selectivity from the Optimizer 106, old_adj: an old adjustment 130 that was possibly used to compute old_est, and act: the actual selectivity that is computed from the monitor information 128.

After detecting an error ($\cdot$|old_est–act|/act>0.05) for the predicate col<X, LEO computes the adjustment 130 so that the new estimate equals the actual value (act) computed from the monitor information 128: est=actual=stats*adj; where stats is the original selectivity as derived from the catalog. The old estimate (old_est) is either equivalent to the original statistic estimate (stats) or is computed with an old adjustment 130 (old_adj). Hence, this old adjustment 130 needs to be factored out: adj=act/stats=act/(old_est/old_adj)=act*(old_adj/old_est).

Since the selectivity for the predicate (col>=X) is 1–selectivity (col<X), the computation of the estimate and the adjustment 130 for this type of predicate are inverted. Note that an adjustment 130 is desired for the<=operator from the results of the>=operator, and the adjustment 130 factor of a<=operator is applied for the computation of the>=operator.

Table I summarizes some of the formulas for computing the adjustments 130 and the new estimates:

TABLE I calculating adjustments and estimates.

| PREDICATE | ADJUSTMENT | NEW ESTIMATE |
| --- | --- | --- |
| None, Table Access | adj = act_card * old_adj / old_est | est_card = stats_card * adj |
| Column < Literal<br>Column <= Literal<br>Column = Literal; | adj = act * old_adj / old_est | est = stats*adj |
| Column > Literal<br>Column >= Literal | adj = (1-act)* old_adj/ (old_est<) | est = 1-est<*adj |
| Column = Column | adj = act * old_adj / old_est | est = stats*adj |

TABLE I-continued calculating adjustments and estimates.

| PREDICATE | ADJUSTMENT | NEW ESTIMATE |
|---|---|---|
| Column LIKE Literal | adj = act * old_adj / old_est | est = stats*adj |
| Complex/UDF | adj = act * old_adj / old_est | est = stats*adj |

Using the example from FIG. 2 and a TBSCAN on table X with the predicate Price>=100, the adjustment 130 for the table cardinality and the predicate can be computed. The cardinality adjustment 130 is 7632/7200=1.06. The estimated selectivity of the predicate was 1149/7200=0.1595 while the actual selectivity is 2283/7632=0.2994. The adjustment 130 for the corresponding Price<100 predicate is (1−0.2994)*1.0/(1−0.1595)=0.8335. The Optimizer 106 will compute the selectivity for this predicate in the future to be 1−0.8335*(1−0.1595)=0.2994. The adjusted table cardinality of the TBSCAN (1.06*7200) multiplied by the adjusted predicate selectivity 0.2994 computes the correct, new estimate of the output cardinality of the TBSCAN operator (2283).

However, different types of Section 116 operators can be used to execute a particular predicate such as 'Price>=100'. If the Price column is in the index key, the table access method could be an IXSCAN-FETCH combination. If Price is the leading column of the index key, the predicate can be executed as a start/stop key in the IXSCAN operator. Then, IXSCAN delivers only those rows (with its row identifier or RID) that fulfill the key predicate. FETCH uses each RID to retrieve the row from the base table. If the predicate on Price cannot be applied as a start/stop key, it is executed as a push-down predicate on every row returned from the start/stop key search. When using a start/stop key predicate, neither the index not the base table is scanned completely, and hence cannot determine the actual base table cardinality. In order to determine the real selectivity of an index start/stop key predicate, the needed input cardinality can only be approximated by using the old cardinality estimates, if a previously computed table adjustment 116 factor was used (see the pseudo-code example line (3) and (4) in Table II below). Note that the existence of an adjustment 130 indicates that the system has seen a complete table scan earlier and successfully repaired an older statistic.

The pseudo-code below in Table II describes how to analyze IXSCAN:

TABLE II

Analyse IXSCAN

```
analyse_ixscan(skeleton IXSCAN) {
    if (start_stop_key_num == 0) // no start stop key:        (1)
    { tcard = get_act_table_( ); we have an actual table cardinality
      rc = compute_table_adjustment(tcard, est_card); // compute/store
                                                     // new adj
      if (pushed_down_pred_num >= 1                          (2)
      {
// get the output cardinality of the first predicate from monitor
        pcard = push_pred[0]->get_pcard( );
        act_sel = pcard/tcard; // this it the actual selectivity
        // compute/store a new adjustment factor
        rc |= push_pred[0]->compute_adj(act_sel);
        if (pushed_down_pred_num > 1)
```

TABLE II-continued

Analyse IXSCAN

```
        { // deal with the second predicate, possibly detecting
          // a combined error i.e a correlation
        }
    }
    return rc;
}
if (start_stop_key_num == 1) // we do not know the table card.
{
    // if the base card estimate includes old_adj factor we assume
    // our estimate is correct and process the predicate
    if (old_adj)                                             (3)
    {
// get the output cardinality of the first key predicate from monitor
        pcard = start_stop_pred[0]->get _stst_pcard( );
        act_sel = pcard/est_card; // predicate selectivity   (4)
        // compute/store a new adjustment factor
        rc |= start_stop_pred[0]->compute_adj(act_sel);
    }
    if (!rc)
    {
    // continue with pushed_down predicates
    ...
    }
    return rc;
}
```

The merge-join algorithm demonstrates a similar problem that has been named "implicit early out". Recall that both inputs of the merge join are sorted data streams. Each row will be matched with the other side until a higher-valued row or no row at all is found. Reaching the end of the data stream on one side immediately stops the algorithm. Thus, any remaining rows from the other side will never be asked for, and hence are not seen or counted by the Runtime Monitor 126. As a result, any Runtime Monitor 126 number for merge-join input streams is unreliable unless a dam operator such as SORT, TEMP, or GROUP BY has been encountered, which ensures the complete scan and count of the data stream prior to the merge join.

3.3.2 Storing the Adjustments

After the adjustments 130 have been computed, they are stored in an extended system catalog. Table III summarizes the new tables that have been introduced into the system catalog.

TABLE III

New System Catalog Tables

| Table | LEO_TABLES | TabelspaceID, TableID, Adj_factor, Cardinality, Timestamp |
|---|---|---|
| Column | LEO_COLUMNS | TabelspaceID, TableID, ColumnID, Adj_factor, Col_Value, Type, TimeStamp |

TABLE III-continued

New System Catalog Tables

| | | |
|---|---|---|
| Join | LEO_JOINS | TabelspaceID, TableID, ColumnID, J_TabelspaceID, J_TableID, J_ColumnID, Adj_factor, TimeStamp |
| Keys | LEO_KEYS | KeyString Adj_factor, Col_Value, Type, TimeStamp |
| Expression | LEO_EXPRESSION | ExpressionString Adj_factor, Col_Value, Type, TimeStamp |

Take, as an example, the column adjustment catalog as stored in LEO_COLUMNS. The first three columns uniquely identify a column (i.e. X.Price), while the Adj_factor=0.8335 and Col_Value='100'. Timestamp is the compile time of the query and is used to prohibit learning from old knowledge. Type indicates the type of entry: 'F' for a frequent value or 'Q' for a quantile adjustment 130 for the corresponding Col_Value value. In LEO_JOINS, a join is sufficiently described by two triplets for the two join columns: (tablespaceID, tableID, columnID, J_tablespaceID, J_tableID, J_columnID). This raises the question as to which column should be the primary column for searching. One obvious solution would be to store each join entry twice, i.e. for a join (T.A=S.B) two rows (2, T, A, 2, S, B, . . . ) and (2, S, B, 2, T, A, . . . ) would be stored, but this would double the overhead of maintaining these entries. Introducing a simple rule of (lexicographic) order on the columns' triplets is sufficient to store the adjustments 130 only once: the 'smaller' column (2, S, B) is stored with its join partner (2, T, A) and the adjustment 103. A simple index scan with a search key on the "smaller" join column allows the system to efficiently update or retrieve the adjustment 130 from the database. LEO_KEYS and LEO_EXPRESSION store the key combination or expression as a character string.

3.4 Using Learned Knowledge

Before the Optimizer 106 begins constructing candidate plans, it first retrieves the schema and statistics 134 for each base table referenced in that query 112 from the catalog cache. From these statistics 134, the Optimizer 106 gets the base-table cardinality and computes selectivity factors for each predicate. At this point, if "learning" is enabled by a control flag, the Optimizer 106 will also search the catalog for any adjustments 130 that may be relevant to this query 112, and adjust the statistics 134, such as base table statistics, predicate selectivities, and other statistics, accordingly. How this is done for each type of adjustment 130 is the subject of this section.

3.4.1 Base Table Cardinalities

LEO starts first with adjusting the base table cardinalities, since these are basis for all cardinality estimates of QEPs 114. As shown in Table I, the statistic 134 for the base-table's cardinality needs only be multiplied by the adjustment 130, if any, for that table.

As discussed earlier, the difficulty comes in maintaining the consistency of this adjusted cardinality with other statistics 134 for that table. The number of pages in the table, NPAGES, is collected during RUNSTATS and is directly used in the model as a more accurate measurement for the number of I/O operations during TBSCAN operations than computing it from the table cardinality, the row width, and the page size. As a result, LEO must adjust NPAGES for base tables, as well as the index statistics 134 (the number of leaf and non-leaf pages) accordingly. In addition, the column cardinalities for each column obviously cannot exceed the table cardinality, but increasing the number of rows may or may not increase the cardinality of any column. For example, adding employee rows does not change the cardinality of the Sex column, but probably changes the cardinality of the EmployeeID column. Similarly, the consistency between index and table statistics has to be preserved. If a column that is in one or more index keys has its cardinality adjusted in the table statistics 134, the corresponding index cardinality statistics 134 (FIRSTKEYCARD, FIRST2KEYCARD, . . . , FULLKEYCARD) must also be adjusted accordingly.

3.4.2 Single-Table Predicates

Figure 3:
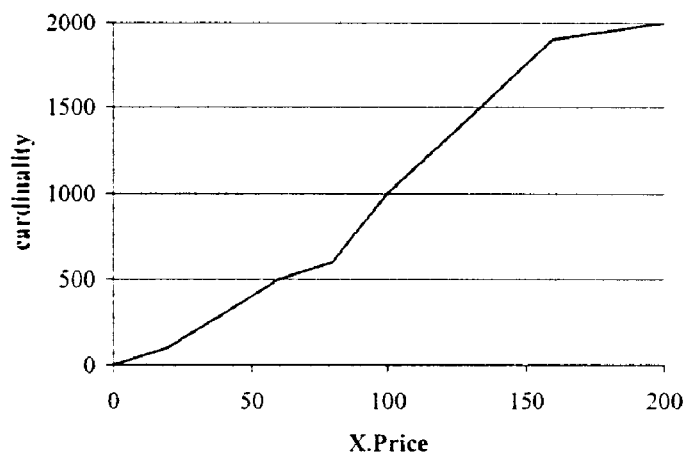
FIG. 3 is a graph that shows an actual cumulative distribution for X.Price according to the preferred embodiment of the present invention.
Figure 4A:
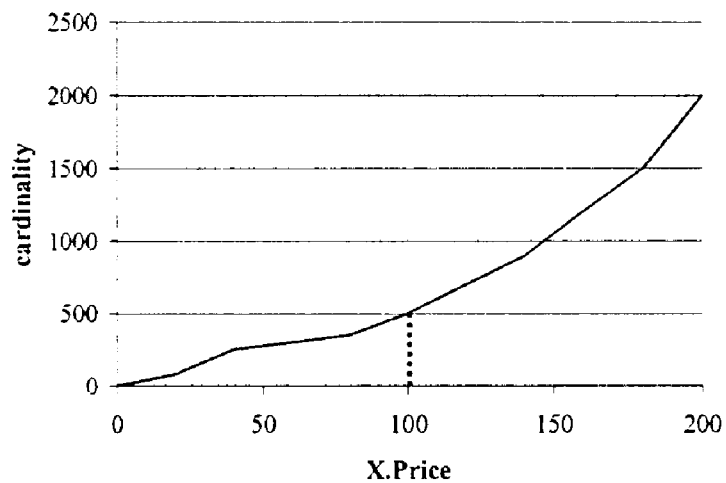
FIGS. 4A and 4B are graphs that show column statistics (FIG. 4A) as well as corresponding adjustments (FIG. 4B) according to the preferred embodiment of the present invention.
Figure 4B:
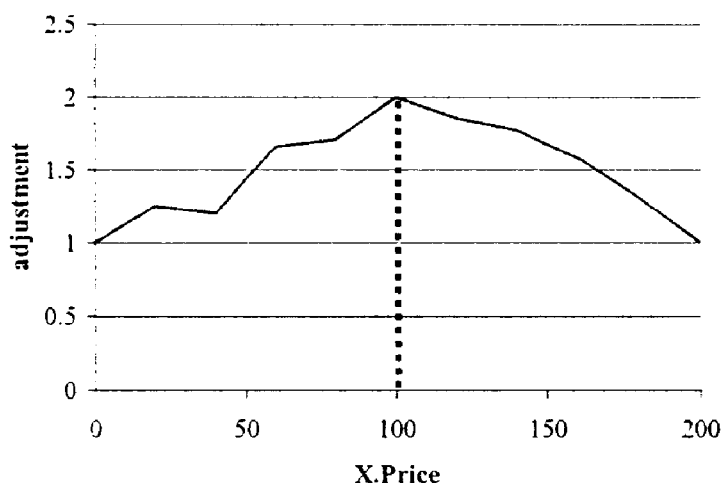

Next, the present invention considers adjustments 130 to the selectivity of a simple, single-table predicate, illustrated by adjusting the column X.Price for the predicate X.Price<100. FIG. 3 shows the actual cumulative distribution for X.Price. FIGS. 4A and 4B are graphs that show column statistics (FIG. 4A) as well as corresponding adjustments 130 (FIG. 4B).

The Optimizer 106 computes the selectivity for X.Price<100 from the statistics 134 by cardinality(X<100)/Maximal_Cardinality=500/2000=0.25. Applying the adjustments 130 results in adjusted selectivity (X.Price<100)=cardinality(X.Price<100)*adjustment (X.Price<100)=0.25*2=0.5. If there is no exact match in the statistics 134 for the column value (i.e. X.Price<100), the adjustment 130 is computed by linearly interpolating within the interval in which the value '100' is found. The neutral adjustment 130 of 1.0 is used if LEARNING is disabled or no adjustments 130 (not even using interpolation) are available.

Figure 5A:
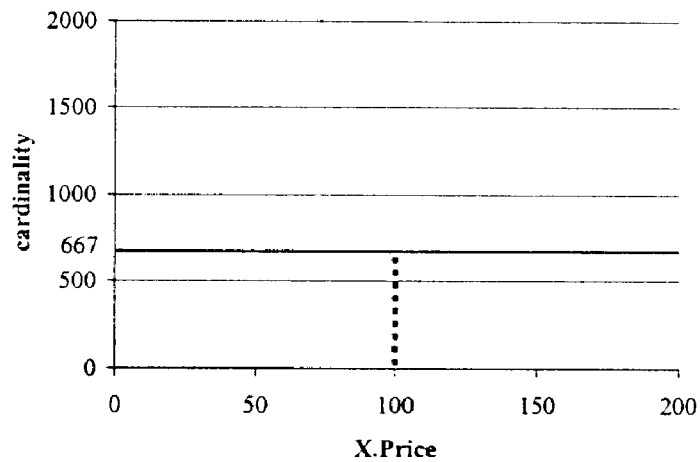
FIGS. 5A and 5B are graphs that show statistics do not exist (FIG. 5A) as well as a corresponding adjustment curve (FIG. 5B) according to the preferred embodiment of the present invention.
Figure 5B:
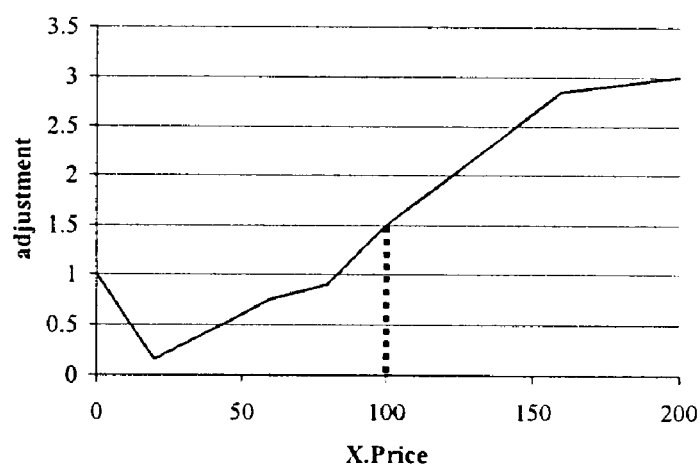

FIGS. 5A and 5B are graphs that show column statistics 134 (FIG. 5A) as well as corresponding adjustments 130 (FIG. 5B) according to the preferred embodiment of the present invention. In FIG. 5A, statistics 134 do not exist (which is equivalent to a default selectivity of ⅓, i.e., a uniformly distributed cardinality of 667). The adjustment 130 curve in FIG. 5B shows higher or lower amplitudes than the one for the statistics 134. For this example: adjustment (X.Price<100)=1.5.

Suppose that the Optimizer 106 had used an earlier adjustment 130 of 2 to compute the estimate for the predicate 'X.Price<100'. Suppose further that, due to more updates, the real selectivity of the predicate is 0.6, instead of the newly estimated 0.5. The Analyzer Daemon 128 needs to be aware of this older adjustment 130 to undo its effects.

In this model, an adjustment 130 is always based on the system's statistics 134 and never an adjustment of an older adjustment 130. The new adjustment 130 is computed by actual_selectivity*old_adjustment/estimate=0.6*2/0.5=2.4. Thus, any previously used adjustment 130 must be saved with the plan skeleton 122. Note that it is not sufficient to look up the adjustment 130 in the system table, since LEO cannot know if it was actually used for that query 112, or if it has changed since the compile time of that query 112.

The LEO approach is not limited to simple relational predicates on base columns, as is the histogram approach of [AC99]. The "column" could be any expression of columns (perhaps involving arithmetic or string operations), the "type" could be LIKE or user-defined functions, and the literal could even be "unknown", as with parameter markers and host variables. The present invention need only match the predicate's pattern in the LEO_EXPRESSION catalog table and find the appropriate adjustment 130.

3.4.3 Join Predicates

As indicated above, LEO can also compute adjustments 130 for equality join operators. The adjustment 130 is simply multiplied by the estimate of the Optimizer 106. Note that having the actual statistics 134 and estimates for each operator permits LEO to eliminate the effect of any earlier estimation errors in the join's input streams.

3.4.4 Other Operators

The GROUP BY and DISTINCT clauses effectively define a key. An upper bound on the resulting cardinality of such operations can be derived from the number of distinct values for the underlying column(s): the COLCARD statistic 134 for individual columns, or the FULLKEYCARD statistic 134 for indexes, if any, on multiple columns. However, predicates applied either before or after these operations may reduce the real cardinalities resulting. Similarly, set operations such as UNION (DISTINCT), UNION ALL, and EXCEPT may combine two or more sets of rows in ways that are difficult for the Optimizer 106 to predict accurately. LEO's Analysis Daemon 128 can readily compute the adjustment 130 as adj=act*old_adj/old_est, and adjust the cardinality output by each of these operators by multiplying its estimate by adj. It is doubtful that the histogram approach of [AC99] could provide adjustments for these types of operations in SQL.

3.4.5 Correlation Between Predicates

The Optimizer 106 usually assumes independence of columns. This allows for estimating the selectivity of a conjunctive predicate as a product of the selectivity of the atomic predicates. However, correlations sometimes exist between columns, when the columns are not independent. In this case, the independence assumption underestimates the selectivity of a conjunctive predicate.

For example, suppose there is a table storing a computer equipment inventory and requesting the owners of all IBM ThinkPad T20 notebooks:

SELECT OWNER

FROM EQUIPMENT

WHERE SUPPLIER="IBM" AND MODEL="T20"

With 10 suppliers and 100 models, this implies sel (supplier="IBM")=1/10 and sel(model="T20")=100. Without correlation, the following is obtained as the overall selectivity of the query:

sel(supplier="IBM" and model="T20")=sel(supplier= "IBM")*sel(model="T20")=1/1000

However, since only IBM produces Thinkpads, there actually is:

sel(supplier="IBM" and model="T20")=sel(model="T20")=1/100

In practical applications, data is often highly correlated. Types of correlations include functional dependencies between columns and referential integrity, but also more complex cases such as a constraint that a part is supplied by at most 20 suppliers. Furthermore, correlations may involve more than two columns, and hence more than two predicates. Therefore, any set of predicates may have varying degrees of correlation.

How are errors due to correlation discerned from errors in the selectivities of the individual predicates? LEO's approach is to first correct individual predicate filter factors, using queries 112 that apply those predicates in isolation. Once these are adjusted, any errors when they are combined must be attributable to correlation.

A single query 112 can provide evidence that two or more columns are correlated for specific values; LEO must cautiously mine the execution of multiple queries 112 having predicates on the same columns before it can safely conclude that the two columns are, in general, correlated to some degree. The multi-dimensional histogram approach of [AC99] could be used here, but presumes that the user knows which columns are correlated and predefines a multidimensional histogram for each. LEO can automatically detect good candidates for these multi-dimensional histograms through its analysis.

The current implementation of LEO only takes advantage of correlations between join columns. An extension of LEO might take further advantage of correlation in order to provide even better adjustments.

4 Performance 4.1 Overhead of LEO's Monitoring

Figure 6:
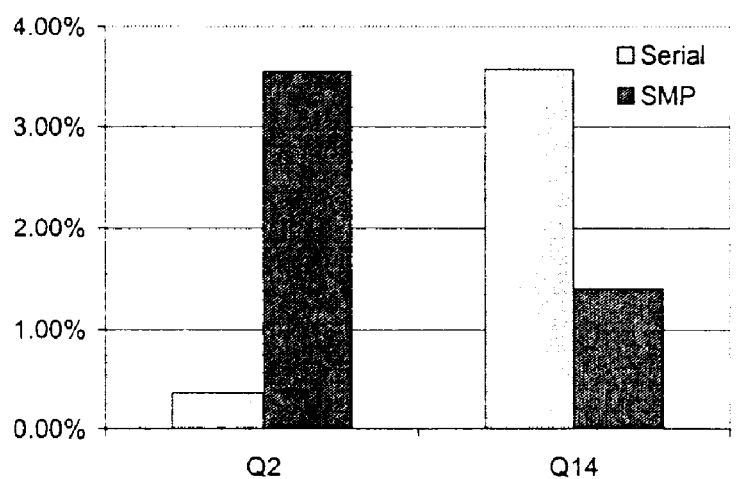
FIG. 6 is a chart that illustrates measurement made for monitoring overhead in an experimental prototype of the preferred embodiment of the present invention.

LEO requires monitoring of QEP 114 executions, i.e., Sections 116, in order to obtain the actual cardinalities for each operator of a Section 116. The performance measurements on a 10 GB TPC-H database [TPC00] show that, for a prototype of LEO, the monitoring overhead is below 5% of the total Section 116 execution time, and therefore may be neglected for most applications. FIG. 6 shows the actual measurement results for the overhead for TPC-H queries Q2 and Q14, measured both on a single-CPU (serial) and on an SMP machine. These overheads were measured on a LEO prototype. For the product version, further optimizations of the Runtime Monitor 126 logic will reduce the monitoring overhead even further.

The architecture permits dynamically enabling and disabling monitoring, on a per-query 112 basis. If time-critical applications cannot accept even this small overhead for monitoring, and thus turn monitoring off, they can still benefit from LEO, as long as other uncritical applications monitor their query 112 execution and thus provide LEO with sufficient information.

4.2 Benefit of Learning

Adjusting outdated or incorrect information may allow the Optimizer 106 to choose a better QEP 114 for a given query 112. Depending on the difference between the new and the old QEP 114, the benefit of LEO may be a drastic speed-up of query 112 execution.

Suppose now that the database in the example has changed significantly since the collection of statistics 134: the Sales stored in table Y increased drastically in December and the inventory stored in table X received many updates and inserts, where most new items had a price greater than 100. This results in an overall cardinality of more than 21623 records for X and 17949 records for Y. Suppose further that these changes also introduce a skew in the data distribution, changing the selectivities of the predicates X.Price>100 and Y.Month='Dec'. Finally, suppose that a query referencing table X with the predicate X.Price>150, and another query referencing Y with the predicate Y.Month='Dec', have been executed, providing LEO with some adjustments 130. Note that it is not necessary to run a query 112 with exactly the predicate X.Price>100, since LEO performs interpolation for histograms. Thus, an adjustment 130 for X.Price>150 would also be useful for a query X.Price>100.

Figure 7:
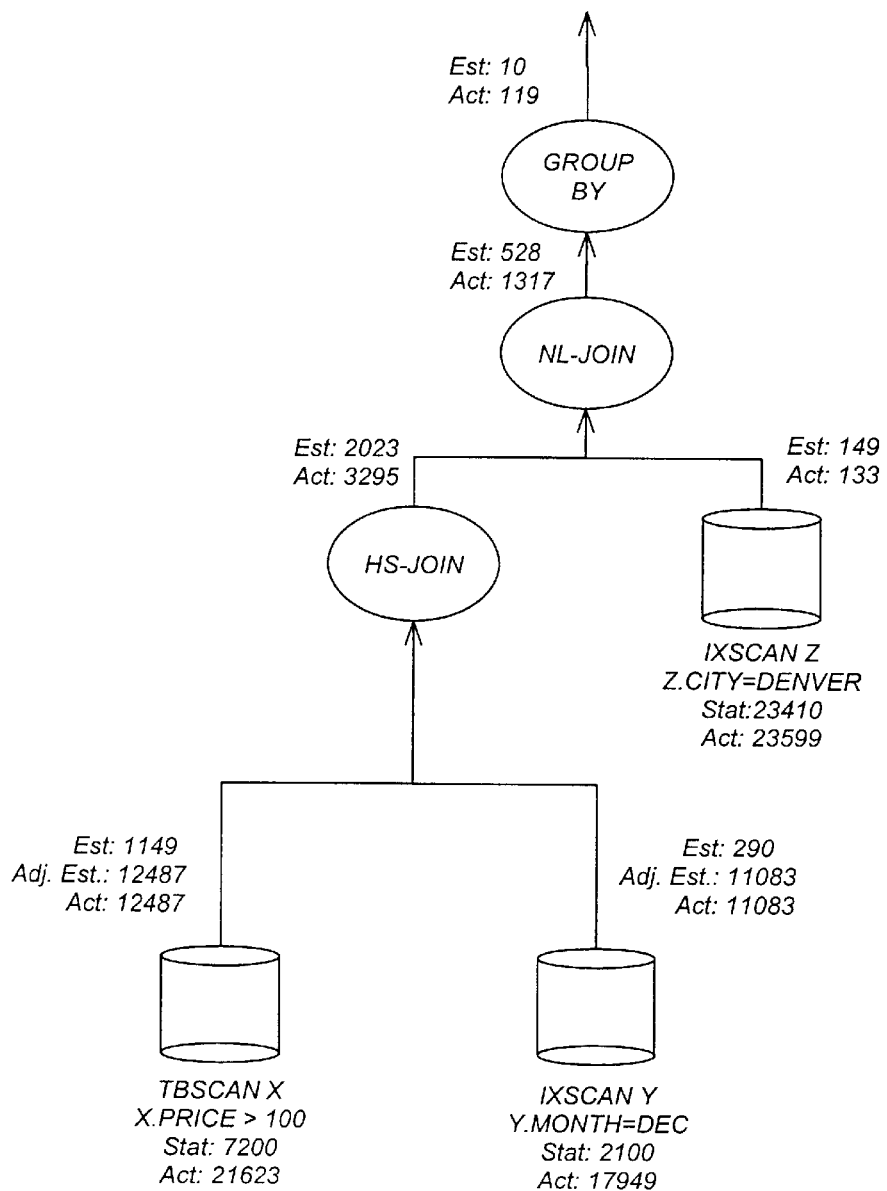
FIG. 7 shows a skeleton of a query execution plan, including statistical information and estimates that an optimizer uses when building the plan, wherein the plan is changed due to adjustments.

FIG. 7 shows how LEO changes the QEP 114 for the query 112 of Section 3.2 after these changes. The Optimizer 106 now chooses to use a bulk method for joining X and Y for this query, thus replacing the nested-loop join with a hash join (HS-JOIN). Note that the index scan on Y was also replaced by a table scan, due to the adjustments 130. This new QEP 114 resulted in an actual execution speed-up of more than one order of magnitude over the earlier QEP 114 executing on the same data.

Experiments on two highly dynamic test databases (artificial schema and TPC-H) showed that the adjustments 130 provided by LEO enabled the Optimizer 106 to choose a QEP 114 that performed up to 14 times better than the QEP 114 without adjustments 130, while LEO consumed an insignificant runtime overhead, as shown in Section 4.1. Of course, speed-ups can be even more drastic, since LEO's adjustments 130 can cause virtually any physical operator of a QEP 114 to change, and may even alter the structure of the QEP 114. The most prominent changes are table access operators (IXSCAN, TBSCAN), join method (NL-JOIN, HS-JOIN, MG-JOIN), and changing the join order for multi-way joins.

5 Advanced Topics 5.1 When to Re-Optimize

A static query 112 is bound to a QEP 114 that the Optimizer 106 has determined during query compilation. With LEO, the QEP 114 for a static query 112 may change over time, since the adjustments 130 might suggest an alternative QEP 114 to be better than the QEP 114 that is currently used for that query 112. The same holds for dynamic queries 112, since the RDBMS 102 stores the optimized QEP 114 for a dynamic query 112 in a statement cache.

Currently, the system 100 does not support rebinding of static queries 112 or flushing the statement cache because of learned knowledge. It remains (for future work) to investigate whether and when re-optimization of a query 112 should take place. Especially for re-optimization, the Hippocratic Oath must be taken into account, since the actual goal of the statement cache and static queries 112 is to avoid re-optimization. Thus, the trade-off between re-optimization and improved runtime must be weighed in order to be sure that re-optimization will result in improved query performance.

5.2 Learning Other Information

Learning and adapting to a dynamic environment is not restricted to cardinalities and selectivities. Using a feedback loop, many configuration parameters of an RDBMS 102 can be made self-tuning. If, for instance, the RDBMS 102 detects by query 112 feedback that a sort operation could not be performed in main memory, the sort heap size could be adjusted in order to avoid external sorting for future sort operations. In the same way, buffer pools for indexes or tables could be increased or decreased according to a previously seen workload. This is especially interesting for resources that are assigned on a per-user basis, e.g., instead of assuming uniformity, buffer pools or sort heaps could be maintained individually per user. If dynamic adaptation is possible even during connections, open but inactive connections could transfer resources to highly active connections.

Another application of adjustments 130 is to "debug" the cost estimate model of the Optimizer 106. If, despite correct base statistics, the cost prediction for a query 112 is way off, analyzing the adjustments 130 of the plan skeleton 122 permits locating which of the assumptions of the cost model are violated.

Physical parameters such as the network rate, disk access time, or disk transfer rate are usually considered to be constant after an initial set-up. However, monitoring and adjusting the transfer rate for disks and network connection enables the Optimizer 106 to act dynamically to the actual workload and use the effective rate.

6 Bibliography

The following references are incorporated by reference herein:

[AC99] A. Aboulnaga and S. Chaudhuri, Self-tuning Histograms: Building Histograms Without Looking at Data, SIGMOD Conference 1999.

[ARM89] R. Ahad, K. V. B. Rao, and D. McLeod, On Estimating the Cardinality of the Projection of a Database Relation, ACM Transactions on Databases, Vol. 14, No. 1 (March 1989), pp. 28–40.

[BCG01] N. Bruno, S. Chaudhuri, and L. Gravano, STHoles: A Multidimensional Workload Aware Histogram, SIGMOD Conference 2001.

[CR94] C. M. Chen and N. Roussopoulos, Adaptive Selectivity Estimation Using Query Feedback, SIGMOD Conference 1994.

[Gel93] A. Van Gelder, Multiple Join Size Estimation by Virtual Domains (extended abstract), Procs. of ACM PODS Conference, Washington, D.C., May 1993, pp. 180–189.

[GMP97] P. B. Gibbon, Y. Matias and V. Poosala, Fast Incremental Maintenance of Approximate Histograms, Proceedings of the 23rd Int. Conf. On Very Large Databases, Athens, Greece, 1999.

[HS93] P. Haas and A. Swami, Sampling-Based Selectivity Estimation for Joins—Using Augmented Frequent Value Statistics, IBM Research Report RJ9904, 1993.

[IBM00] DB2 Universal Data Base V7 Administration Guide, IBM Corp., 2000.

[IC91] Y. E. Ioannidis and S. Christodoulakis. On the Propagation of Errors in the Size of join Results, SIGMOD Conference, 1991.

[KdeW98] N. Kabra and D. DeWitt, Efficient Mid-Query Re-Optimization of Sub-Optimal Query Execution Plans, SIGMOD Conference 1998.

[Lyn88] C. Lynch, Selectivity Estimation and Query Optimization in Large Databases with Highly Skewed Distributions of Column Values, Proceedings of the 14th Int. Conf. On Very Large Databases, 1988.

[PI97] V. Poosala and Y. Ioannidis, Selectivity Estimation without the attribute value independence assumption, Proceedings of the 23rd Int. Conf. On Very Large Databases, 1997.

[PIHS96] V. Poosala, Y. Ioannidis, P. Haas, and E. Shekita, Improved histograms for selectivity estimation of range predicates, SIGMOD Conf. 1996, pp. 294–305.

[SAC+79] P. G. Selinger, M. M. Astrahan, D. D. Chamberlin, R. A. Lorie, T. G. Price, Access Path Selection in a Relational Database Management System, SIGMOD Conference 1979, pp. 23–34.

[SS94] A. N. Swami, K. B. Schiefer, On the Estimation of Join Result Sizes, EDBT 1994, pp. 287–300.

[TPC00] Transaction Processing Council, TPC-H Rev. 1.2.1 specification, http://www.tpc.org/benchmark_specifications/Tpc-h/h121.pdf, 2000.

[UFA98] T. Urhan, M. J. Franklin and L. Amsaleg, Cost-based Query Scrambling for Initial Delays, SIGMOD Conference 1998.

7 Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any database management system could benefit from the present invention. Moreover, any type of optimization modeling, such as rule-based modeling rather than cost-based modeling, could benefit from the present invention.

In summary, the present invention discloses a method, apparatus, and article of manufacture for optimizing queries in a Relational Database Management System (RDBMS) by generating a plurality of query execution plans (QEPs) for the query, providing an execution model of each of the QEPs, choosing one of the QEPs for execution based on the model associated therewith, and exploiting an empirical measurement from the execution of the chosen QEP to validate the model associated therewith, by determining whether the model is in error, and by computing one or more adjustments to the model to correct the determined error.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of performing a query in a computer system to retrieve data from a database stored on the computer system, the method comprising:
   (a) generating a plurality of query execution plans (QEPs) for the query;
   (b) providing an execution model of each of the QEPs;
   (c) choosing one of the QEPs for execution based on the model associated therewith; and
   (d) using a feedback loop to monitor the execution of the chosen QEP, to analyze information from the monitored execution, to compute adjustments to the model using the analyzed information, and in exploit the computed adjustments to refine the model, wherein the model is used to estimate intermediate results at each step of the QEP.

2. The method of claim 1, wherein the model comprises a cost estimate based on statistics for distinct values.

3. A method of performing a query in a computer system to retrieve data from a database stored on the computer system, the method comprising:
   (a) generating a plurality of query execution plans (QEPs) for the query;
   (b) providing an execution model of each of the QEPs;
   (c) choosing one of the QEPs for execution based on the model associated therewith; and
   (d) using a feedback loop to monitor the execution of the chosen QEP, to analyze information from the monitored execution, and to determine from the analyzed information which statistics should be created.

4. The method of claim 1, wherein the statistics comprise statistics for single columns on base tables.

5. The method of claim 3, wherein the statistics comprise statistics for multiple columns on a single base table.

6. The method of claim 3, wherein the statistics comprise statistics for an intermediate result defined by a view.

7. A method of performing a query in a computer system to retrieve data from a database stored on the computer system, the method comprising:
   (a) generating a plurality of query execution plans (QEPs) for the query;
   (b) providing an execution model of each of the QEPs;
   (c) choosing one of the QEPs for execution based on the model associated therewith; and
   (d) using a feedback loop to monitor the execution of the chosen QEP, to analyze information from the monitored execution, to compute adjustments to the model using the analyzed information, and to exploit the computed adjustments to refine the model, wherein the model is used to determine a cost of the QEP at each step of the QEP.

8. The method of claim 7, wherein the cost comprises characteristics of the data being retrieved by the QEP, machine resources used to execute the QEP, or time required to process one or more steps of the QEP.

9. The method of claim 7, further comprising using the computed adjustments to the model to optimize the QEPs.

10. A computer-implemented apparatus fox performing a query, comprising:
    a computer system, wherein the query is performed by the computer system to retrieve data from a database stored on rite computer system;
    logic, performed by the computer system, for:
    (a) generating a plurality of query execution plans (QEPs) for the query;
    (b) providing an execution model of each of the QEPs;
    (c) choosing one of the QEPs for execution based on the model associated therewith; and
    (d) using a feedback loop to monitor the execution of the chosen QEP, to analyze information from the monitored execution, to compute adjustments to the model using the analyzed information, and to exploit the computed adjustments to refine the model, wherein the model is used to estimate intermediate results at each step of the QEP.

11. The apparatus of claim 10, wherein the model comprises a cost estimate based on statistics for distinct values.

12. A computer-implemented apparatus for performing a query, comprising:
    a computer system, wherein the query is performed by the computer system to retrieve data from a database stored on the computer system;
    logic, performed by the computer system, for:
    (a) generating a plurality of query execution plans (QEPs) for the query;
    (b) providing an execution model of each of the QEPs;
    (c) choosing one of the QEPs for execution based on the model associated therewith; and
    (d) using a feedback loop to monitor the execution of the chosen QEP, to analyze information from the monitored execution, and to determine from the analyzed information which statistics should be created.

13. The apparatus of claim 12, wherein the statistics comprise statistics for single columns on base tables.

14. The apparatus of claim 12, wherein the statistics comprise statistics for multiple columns on a single base table.

15. The apparatus of claim 12, wherein the statistics comprise statistics for an intermediate result defined by a view.

16. A computer-implemented apparatus for performing a query, comprising:
    a computer system, wherein the query is performed by the computer system to retrieve data from a database stored on the computer system;
    logic, performed by the computer system, for:
    (a) generating a plurality of query execution plans (QEPs) for the query;
    (b) providing an execution model of each of the QEPs;
    (c) choosing one of the QEPs for execution based on the model associated therewith; and
    (d) using a feedback loop to monitor the execution of the chosen QEP, to analyze information from the monitored execution, to compute adjustments to the model using the analyzed information, and to exploit the computed adjustments to refine the model, wherein the model is used to determine a cost of the QEP at each step of the QEP.

17. The apparatus of claim 16, wherein the cost comprises characteristics of the data being retrieved by the QEP, machine resources used to execute the QEP, or time required to process one or more steps of the QEP.

18. The apparatus of claim 16, further comprising logic for using the computed adjustments to the model to optimize the QEPs.

19. An article of manufacture embodying logic for performing a query in a computer system to retrieve data from a database stored in a data storage device coupled to the computer system, the logic comprising:
   (a) generating a plurality of query execution plans (QEPs) for the query;
   (b) providing an execution model of each of the QEPs;
   (c) choosing one of the QEPs for execution based on the model associated therewith; and
   (d) using a feedback loop to monitor the execution of the chosen QEP, to analyze information from the monitored execution, to compute adjustments to the model using the analyzed information, and to exploit the computed adjustments to refine the model, wherein the model is used to estimate intermediate results at each step of the QEP.

20. The article of claim 19, wherein the model comprises a cost estimate based on statistics for distinct values.

21. An article of manufacture embodying logic for performing a query in a computer system to retrieve data front a database stored in a data storage device coupled to the computer system, the logic comprising:
   (a) generating a plurality of query execution plans (QEPs) for the query;
   (b) providing an execution model of each of the QEPs;
   (c) choosing one of the QEPs for execution based on the model associated therewith; said
   (d) using a feedback loop to monitor the execution of the chosen QEP, to analyze information from the monitored execution, and to determine from the analyzed information which statistics should be created.

22. The article of claim 21, wherein the statistics comprise statistics for single columns on base tables.

23. The article of claim 21, wherein the statistics comprise statistics for multiple columns on a single base table.

24. The article of claim 21, wherein the statistics comprise statistics for an intermediate result defined by a view.

25. An article of manufacture embodying logic for performing a query in a computer system to retrieve data from a database stored in a data storage device coupled to the computer system, the logic comprising:
   (a) generating a plurality of quay execution plans (QEPs) for the query;
   (b) providing an execution model of each of the QEPs;
   (c) choosing one of the QEPs for execution based on the model associated therewith; and
   (d) using a feedback loop to monitor the execution of the chosen QEP, to analyze information from the monitored execution, to compute adjustments to the model using the analyzed information, and to exploit the computed adjustments to refine the model, wherein the model is used to determine a cost of the QEP at each step of the QEP.

26. The article of claim 25, wherein the cost comprises characteristics of the data being retrieved by the QEP, machine resources used to execute the QEP, or time required to process one or more steps of the QEP.

27. The article of claim 25, further comprising using the computed adjustments to the model to optimize the QEPs.

28. A method of performing a query in a computer system to retrieve data from a database stored on the computer system, the method comprising:
   (a) generating a plurality of query execution plans (QEPs) for the query;
   (b) providing an execution model of each of the QEPs;
   (c) choosing one of the QEPs fox execution based on the model associated therewith; and
   (d) using a feedback loop to monitor the execution of the chosen QEP and to analyze information from the monitored execution;
   (e) wherein the feedback loop is used to compute adjustments to the model using the analyzed information, and to exploit the computed adjustments to refine the model, wherein the model is used to estimate intermediate results at each step of the QEP;
   (f) wherein the feedback loop is used to determine from the analyzed information which statistics should be created; and
   (g) wherein the feedback loop is used to compute adjustments to the model using the analyzed information, and to exploit the computed adjustments to refine the model, wherein the model is used to determine a cost of the QEP at each step of the QEP.

* * * * *